Figure 1:
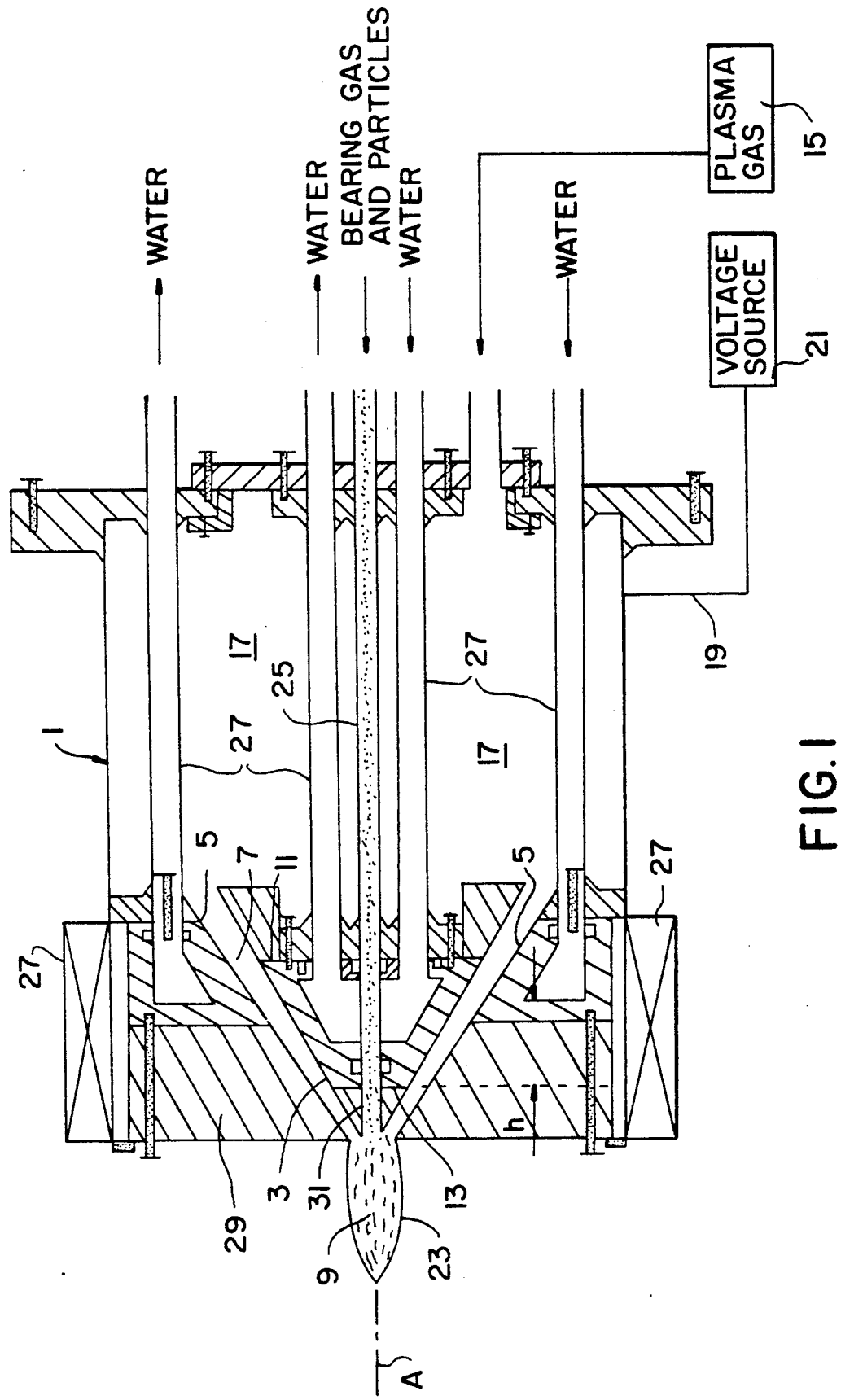

United States Patent [19]

Szente et al.

[11] Patent Number: 5,298,714
[45] Date of Patent: Mar. 29, 1994

[54] PLASMA TORCH FOR THE TREATMENT OF GASES AND/OR PARTICLES AND FOR THE DEPOSITION OF PARTICLES ONTO A SUBSTRATE

[75] Inventors: Roberto N. Szente; Michel G. Drouet, both of Montréal; Richard J. Munz, Westmount, all of Canada

[73] Assignee: Hydro-Quebec, Montreal, Canada

[21] Appl. No.: 983,739

[22] Filed: Dec. 1, 1992

[51] Int. Cl.⁵ .............................................. B23K 9/00
[52] U.S. Cl. ......................... 219/121.48; 219/121.47; 219/76.16; 219/121.52; 118/308
[58] Field of Search ...................... 219/121.48, 121.52, 219/121.47, 76.16, 76.15, 75; 427/34, 39

[56] References Cited

U.S. PATENT DOCUMENTS

| | | | |
|---|---|---|---|
| 4,242,562 | 12/1980 | Karinsky et al. | 219/121.47 |
| 4,683,367 | 7/1987 | Drouet | 219/121.59 |
| 4,847,466 | 7/1989 | Pasquini et al. | 219/121.59 |
| 4,964,568 | 10/1990 | Rotolico et al. | 219/121.47 |
| 5,148,986 | 9/1992 | Rusch | 219/121.47 |

OTHER PUBLICATIONS

Marantz, "Electromagnetically Coalesced Multi-Arc Plasma Torch with True Axial Powder Feed," Proceedings of the Third National Thermal Spray Conference, May 25, 1990, pp. 443-449.
Arata, "New Technology for Processing and Evaluating Thermal Sprayed Coatings," Welding Research Institute of Osaka University, undated article, pp. 309-311.
Britton, "Improved Coating Performance by the Advanced Plasma Gun System (APGS)," undated article, pp. 71-80.

*Primary Examiner*—Mark H. Paschall
*Attorney, Agent, or Firm*—Foley & Lardner

[57] ABSTRACT

A plasma torch for the treatment of gases of particles, or for the deposition of particles onto a substrate, which has two concentrical electrodes coaxially mounted onto a support. The gases or particles to be treated or deposited are injected through an injection passage that is coaxial with the central electrode and opens centrally into an outlet nozzle so as to inject the gases or particles centrally and coaxially within the center of the flame torch without unduly affecting the characteristics of the plasma. In use, the central electrode extends well downstream of the peripheral electrode, whereby the electric arc may not block the injection passage. Moreover, a magnetic field is generated externally to the electrodes in the direction parallel to the annular passage defined between the electrodes in order to rotate the electric arc within the passage and thus reduces the erosion of the electrodes while ensuring better heating of the plasma gas.

7 Claims, 2 Drawing Sheets

PLASMA TORCH FOR THE TREATMENT OF GASES AND/OR PARTICLES AND FOR THE DEPOSITION OF PARTICLES ONTO A SUBSTRATE

BACKGROUND OF THE INVENTION a) Field of the Invention

The present invention relates to a plasma torch particularly well adapted for the treatment of gases and/or particles and for the deposition of particles onto a substrate.

b) Brief Description of the Prior Art

It has been known for years to use plasma torches for the treatment of gases and/or particles, or for the deposition of particles onto a substrate. Thus, plasma torches can be used for the deposition onto a substrate of one or more layers of particles of different sizes to form, for example, a coating of ceramic particles. Plasma toches can also be used for the treatment of ceramic layers already deposited on a substrate. Plasma torches may further be used for the production or purification of gases and/or particles, in particular ceramic particles, by solid/gas or gas/gas reaction. The particles and/or gases that are injected into the plasma or put in contact therewith, chemically react or are physically modified during their displacement before being deposited onto the substrate, collected in a crucible or recovered.

In most of the plasma torches presently used for the treatment of gases and/or particles or for the deposition of particles onto a substrate, the gases or particles to be treated or deposited are radially injected into the flame. In the case of particles, such an injection calls for a substantial amount of a bearing gas that is usually at ambient temperature, viz. at a temperature substantially different from the temperature of the flame. In practice, this results in a substantial reduction in the temperature of the plasma and consequently in the heat transfer that is required between the plasma and the particles to be deposited, treated or reacted. This also affects the arc voltage. Moreover, radial injection of the particles into the flame causes a segregation of said particles as a function of their sizes, the larger particles having different residence times and heating than the smaller ones. This results in a non-uniform heating of the particles and in poor coatings. In this connection, reference can be made to the preamble of the article of Daniel R. Marantz, entitled "Electromagnetically coalesced multi-arc plasma torch with true axial powder feed" (Thermo Spray Research and Application, Proceedings on the third National Thermo Spray conference, Long Beach, Calif. May 20 to 25, 1990).

To overcome this problem, it has already been suggested to inject the gases and/or particles directly in the middle of the flame. This solution is proposed in the above mentioned article of Daniel R. Marantz, which discloses an apparatus comprising a plurality of plasma torches of conventional structure, which are equally distributed along a circle in such a manner that their flames converge to a same place where the gases or particles to be treated or deposited, are injected.

The main problem with this particular arrangement it that the gases or particles are not injected in the middle of a ring of plasma, but between a plurality of plasma flames whose temperatures, flow rates and viscosities may be different. As a result, the distribution of the injected gases or particles within the flame may be very bad, thereby leading to products or coatings of very bad quality.

In this connection, it is worth mentioning that, due to its flow rate, speed and temperature, the flame of a plasma torch has a given viscosity which can make the injection and the mixing of another gas or particles with the plasma very difficult and/or the distribution of particles within the flame, very irregular.

To tentatively solve this other problem, it has been suggested by another author, Yoshiaki ARATA, in an article entitled "New Technology for processing and evaluating thermo-spray coatings", to use a new kind of plasma torch comprising electrodes that are concentrically mounted to define between them an annular passage which opens into an outlet nozzle. This particular arrangement allows for a much better distribution of gases or particles in the flame, because the gases or particles are injected in the middle of the plasma tunnel that is created when the plasma gas is injected in the annular passage. The gases or particles that are injected in the middle of the plasma tunnel are "sucked in" by the plasma and are thus very well distributed within the flame. However, this arrangement where the central electrode is short and extends upstream of the peripheral electrode, has proved to be a source of problem. Indeed, in such a case, the gases or particles are injected into the arc, thereby interfering with the characteristics of the plasma formed by this arc. It has also been found that the arc, depending on its position, may even "block" the outlet through which the particles are injected into the flame, due to the melting of the coming particles or even the electrode tip.

OBJECT AND SUMMARY OF THE INVENTION

The object of the present invention is to provide a plasma torch for the treatment of gases and/or particles, or for the deposition of particles onto a substrate, which overcomes most of the problems explained hereinabove.

More particularly, the object of the invention is to provide a plasma torch for the treatment of gases and/or particles or for the deposition of particles onto a substrate, which, thanks to its improved structure, has the following advantages as compared to the similar plasma torches known to the Applicant:

a) increase of the heat transfer between the plasma and the gases or particles to be treated or reacted;

b) increase of the mass transfer between the plasma and the gases or particles to be treated or reacted;

c) decrease in the amount of carrier gas necessary for the injection of particles into the flame, thereby resulting in higher heating efficiency;

d) no problem of segregation of particles when using conventional plasma torches for particle injection (on the side of the flame), thereby resulting in more uniform heating of the particles and better coatings;

e) increase in the residence time of the particles to be treated or reacted in the plasma flame, resulting in higher heating/reacting efficiencies;

f) capacity of treating any type of gases or particles because of the non-interference of the latter in the characteristics of the plasma and electric arc;

g) overall higher efficiency of the process as compared to conventional plasma torches used either for coatings or treatment of gases or particles;

h) flexibility of operation conditions (voltage, current, gas flow rate, type of plasma gas), making it possible to establish an operating condition where there is no fluctuation in the plasma (i.e. no voltage or current fluctuations); and i) no blocking of the particles and/or gas feeding tube.

The plasma torch according to the invention is similar to the one disclosed by Yoshiaki ARATA in his above mentioned article, in that it comprises:

supporting means having a longitudinal axis;

a central electrode and a peripheral electrode coaxially mounted onto the supporting means, these electrodes being concentrically arranged and defining therebetween an annular passage opening into an outlet nozzle coaxially mounted onto the supporting means;

means for injecting a plasma gas into the annular passage so that it moves in a given direction toward the outlet nozzle;

means for electrically connecting the electrodes to a D.C. voltage source in order to generate an electric arc between the electrodes and to ionize the plasma gas so as to form a plasma of given characteristics, said plasma escaping from the passage through the outlet nozzle in the form of a flame of a given temperature and velocity;

means for injecting the gases or particles to be treated or deposited into the flame escaping from the outlet nozzle, the injecting means comprising an injection passage that is coaxial with the central electrode and opens centrally into the outlet nozzle so as to inject the gases or particles to be treated or deposited centrally and coaxially within the center of the flame without unduly affecting the characteristics of the plasma;

an optional, water cooling circuit mounted within the supporting means in order to cool this supporting means, the electrodes and the injecting means;

at least one optional, insulating cover downstream of the electrodes and the outlet nozzle in order to protect the same.

In accordance with the invention, this basic structure which is known per se, is improved in that, in normal use, the central electrode extends downstream of the peripheral electrode with respect to the given direction into which the plasma gas is injected. This is exactly opposite to what has been proposed by ARATA in his above mentioned article.

It has surprisingly been discovered by the inventors that this very particular positioning of the peripheral electrode well downstream of the central electrode relative to the direction of injection of the plasma gas, permits the solution of both the above mentioned problems a simple yet efficient manner i.e. the modifications that may be caused by the injected gases or particles to the characteristics of the plasma and the blocking of the injection passage. Indeed, in the plasma torch according to the invention, the electric arc necessarily extends upstream of the particles or gases injection zone, and thus cannot be affected by the injection of gases or particles into the flame. As a matter of fact, in accordance with the invention only the temperature and velocity profile of the flame (not the arc) is affected, but to a lesser extent than before, because thanks to the axial injection of the particles into the flame in the case of particle treatment or deposition, the amount of bearing gas that is required to carry the particles into the flame is much less than is presently needed with the conventional plasma torches.

In accordance with the invention, the basic structure disclosed hereinabove is also improved in that the torch further comprises means mounted on the supporting means for generating a magnetic field that is external to the electrodes and extends in a direction parallel to the longitudinal axis of the torch in order to rotate the electric arc within the passage between the electrodes. This, in practice, results in lower local heating of the electrodes and thus in lower erosion of said electrodes. This also results in a better mixing between the plasma gas and the gases or particles injected thereto.

Thus, this second feature of the invention is very important as it permits to reduce in a very substantial manner, the erosion of the electrodes while providing a better mixing of the plasma gas with the injected gases or particles to be treated or deposited. More importantly, this other feature has the particularity of generating a uniform plasma tube all around the point where the particles are axially injected into the flame. As a result, perfect distribution of the gases or particles to be treated within the flame is achieved in spite of high plasma viscosity.

The means for generating the magnetic field around the electrodes in such a manner as to rotate the electric arc within the passage between the electrodes, may comprise externally mounted, permanent or non-permanent magnets, or electrically actuated coils. The way such magnets or coils can be used for rotating the electric arc in the plasma torch is well known and an example of coils of variable magnetic field applied to a plasma torch, is described in detail in U.S. Pat. No. 4,683,367 issued on Jul. 28, 1989 in the name of HYDRO-QUÉBEC.

In accordance with a preferred embodiment of the invention, the outlet nozzle is preferably formed within the insulating cover that can be made of boron nitride, alumina or of any similar material that is not electrically conductive and has high thermal resistance properties. In other words, the electrically insulating and heat resistant cover can make the nozzle. Alternatively, this cover can be used as a support for a metal nozzle.

In accordance with another preferred embodiment of the invention, the central electrode has a frustro-conical shape, and the annular passage between the electrode shape and has a conical shape and opens into the outlet nozzle.

The central and peripheral electrodes may respectively be an anode and a cathode. Alternatively, the central and peripheral electrodes may respectively be a cathode and an anode. In the latter case, the central electrode preferably comprises a ring-shaped insulation tip through which the gases or particles to be treated may be injected.

The electrodes can be made of any kind of metal conventionally used for this purpose. However, according to a particularly advantageous embodiment of the invention, which comes from fact that erosion is substantially reduced in the torch according to the invention, the electrodes are advantageously made of copper, or copper alloys which makes the torch useful with different kinds of plsma gases. This is substantially different from the plasma torch which comprises tungsten electrodes, as such electrodes can only be used with hydrogen, argon and, under certain circumstances, nitrogen.

Another advantage of the present invention is the fact that the voltage can be much higher than the one conventionally used in plasma torches. Of course, the selected voltage depends on the type of plasma gas that issued, the gas flow rate, the distance between the electrodes and the arc current. However, due to the flexibility of operation of the plasma torch according to the present invention, use can be made of a voltage ranging from 30 to 400 V, preferably 30 to 170 V, without any problem, which, for a given power, permits to reduce in an inversely proportional manner, the current intensity and, thereby, the erosion of the electrodes, which is known to be directly related to the current intensity.

As indicated hereinabove, the plasma torch according to the invention can be used for the deposition of particles on a substrate, as well as for the treatment of particles. It can also be used for the treatment of a gas or a mixture of gases that may be injected axially through the injection passage in the same way as the particles.

Figure 2:
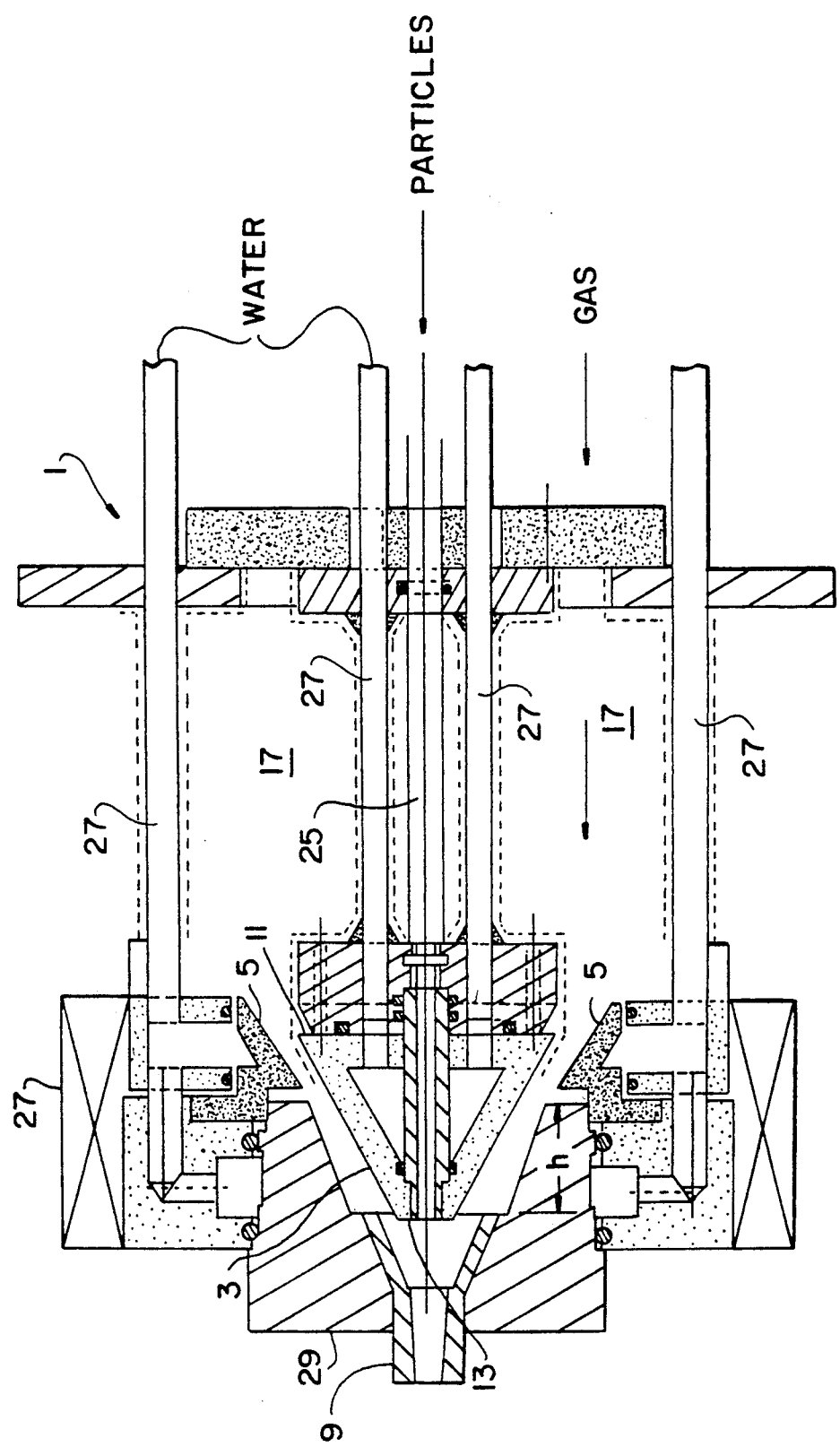

Two non-restrictive embodiments of the invention will now be described with reference to the accompanying drawings, in which:

FIG. 1 is a schematic cross-section of a plasma torch according to a first embodiment of the invention; and FIG. 2 is a schematic cross-section view of a plasma torch according to a second embodiment of the invention.

In both of these figures, the same reference numerals have been used for identifying the same structural elements.

The plasma torch shown in FIG. 1 of the drawings, comprises supporting means 1 which can be of any shape and/or design. The supporting means 1 has a longitudinal axis "A". A central electrode 3 and a peripheral electrode 5 are coaxially mounted on the supporting means 1. As shown, the electrodes 3 and 5 are coaxially are arranged and define between them an annular passage 7 opening into an outlet nozzle 9 coaxial with the axis "A" of the supporting means 1.

The central electrode 3 has a frustro-conical shape, with a base 11 that extends substantially at the same level as a peripheral electrode 5. The apex of the central electrode 3 extends well downstream of the peripheral electrode with respect to the direction of the plasma gas injected into the annular passage 7, as will be explained hereinafter. The distance between the tip of the central electrode and the edge of the peripheral electrode that is the closest to the tip, is identified by the letter "h" in FIG. 1. The internal surface of the peripheral electrode 5 is selected in such a manner that the annular passage 7 defined between the electrodes 3 and 5 and opening into the outlet nozzle 9, has a conical shape.

Means including a source of plasma gas 15 as well as cavities and/or ducts made in, or mounted within the supporting means 1, are used for injecting a plasma gas into the annular passage 7 in such a manner that the plasma gas flows towards the outlet nozzle 9. Means comprising electrical connections schematically shown by the line 19 in the drawings, are also provided for electrically connecting the electrodes 3 and 5 to a D.C. voltage source 21 in order to generate an electric arc between the electrodes and thus ionize the plasma gas so as to form a plasma. As can be appreciated, the gas that is so injected and heated, forms a plasma which escapes from the passage through the outlet nozzle in the form of a flame 23 of given temperature and velocity.

Means are provided for injecting the gases or particles to be treated or deposited into the flame 23 escaping from the outlet nozzle 9. These means for injecting the gases or particles comprise a pipe for bringing the gases to be treated or the bearing gas carrying the particles to be treated or deposited, up to an injection passage 25 made in the central electrode 3. More particularly, the injection passage 25 extends coaxially through the central electrode 3 in such a manner as to open just in the center of the outlet nozzle 9 and thus to inject the gases or particles to be treated or deposited centrally and coaxially within the nozzle 9, in the center of the flame 23, without unduly affecting the characteristics of the electric arc that extends upstream between the electrodes.

As indicated hereinabove, this particular structure has the advantage of ensuring a good distribution of the injected gases or particles within the flame, as the gases or the particles are injected just in the middle of the tunnel of plasma that is created when the plasma gas is injected into the annular passage 7. This structure is also advantageous in that the gases or particles that are injected just in the middle of the plasma tunnel, are entrained into the same and are thus well distributed within the flame. In addition, this structure is advantageous in that, thanks to the very particular position of the central electrode the tip of which extends well downstream of the peripheral electrode 5, there is no more risk for the electric arc to block the injection passage and/or have its characteristics affected by the injected gases or particles.

According to an important aspect of the invention, the torch also comprises means 27 that consists of permanent or non-permanent magnets or of electrically operated coils, in order to generate a magnetic field external to the electrodes 3 and 5 in a direction parallel to the longitudinal axis of the annular passage 7 for rotating the electrical arc within the passage 7 between the electrodes, thereby reducing the erosion of these electrodes while ensuring a better mixing of the gas. The fact that the arc is driven into rotation has several advantages. First of all, this permits the reduction of local heating of the electrodes and thus reduces in a substantial manner the erosion of the electrodes. Rotation of the arc is also useful because this creates a uniform ring or tunnel of plasma everywhere around the point where the gas or particles are axially injected into the flame 23, thereby ensuring proper sucking of the gas or particles within the flame, whatever be the viscosity of the flame, that may be relatively high.

The plasma torch shown in FIG. 1 further comprises a water cooling circuit 27 mounted within the supporting means 1 for cooling this supporting means 1, the electrodes 3 and 5 and, optionally, the outlet nozzle 9. It should be noted that the nozzle can be kept hot or cold depending on the kind of material it is made of. The plasma torch also comprises a cover 29 that must be electrically insulating and thermally resistant and can be made of boron nitride, alumina, or of any other similar material mounted downstream of the electrodes and the outlet nozzle, for protecting the same.

As shown in FIG. 1, the outlet nozzle 9 may consist of a hole made in the insulating cover 29.

Alternatively, as shown in FIG. 2, the outlet nozzle may consist of a separate piece that is inserted into a hole provided for this purpose in the insulating cover 29.

In the embodiment shown in FIG. 1, the D.C. voltage source 21 is connected to the electrode in such a manner that the central electrode 3 is the cathode and the peripheral electrode 5 is the anode. In this particular case, tests carried out by the Applicant have shown that it is useful to protect the end 13 of the cathode 3 by means of a ring-shaped insulation tip 31 through the middle of which opens the injection passage 25.

In the embodiment showing FIG. 2, the electrical connection is made in such a manner that the central electrode 3 is the anode and the peripheral electrode 5 is the cathode. In this particular case, tests carried out by the Applicant have shown that it is not necessary to protect the end 13 of the central electrode which is the anode.

As indicated hereinabove, the particular structure of the torch according to the invention, permits the use inter alia copper or copper alloys electrodes, thereby making the torch useful with any kind of plasma gas. In addition, the voltage can be much higher than the voltage commonly used for plasma torches. Thus, the voltage source 21 could be as high as 400 V thanks to the flexibility of operation of the torch, which, for the given power, permits the reduction in an inversely proportional manner, the current intensity and, accordingly, the importance of the erosion of the electrodes.

Of course, numerous modifications could be made to the two preferred embodiments of the invention disclosed hereinabove, without departing from the scope of the present invention as defined in the appended claims. Thus, for example, it has been disclosed hereinabove that the central electrode is mounted well downstream of the peripheral electrode onto the supporting means. This is actually just one possible arrangement, another arrangement being that displacement of the electrodes to reach this required position, be carried out during operation of the torch such as, for example, after having started the same, by means of electric or pneumatic means.

We claim:

1. A plasma torch for the treatment of gases or particles or for the deposition of particles onto a substrate, said torch comprising:
   supporting means having a longitudinal axis;
   a central electrode and a peripheral electrode coaxially mounted onto the supporting means, said electrodes being concentrically arranged and defining therebetween an annular passage opening into an outlet nozzle coaxially mounted onto the supporting means;
   means for injecting in a given direction a plasma gas into the annular passage toward the outlet nozzle;
   means for electrically connecting said electrodes to a D.C. voltage source in order to generate an electric arc between said electrodes and to ionize the plasma gas so as to form a plasma of given characteristics, said plasma escaping from the passage through the outlet nozzle in the form of a flame of a given temperature and velocity; and
   means for injecting the gases or particles to be treated or deposited into the flame escaping from the outlet nozzle, said injecting means comprising an injection passage that is coaxial with the central electrode and opens centrally into the outlet nozzle so as to inject the gases or particles to be treated or deposited centrally and coaxially within the center of the flame without unduly affecting the characteristics of the plasma;
   wherein, in normal use, said central electrode extends well downstream of said peripheral electrode with respect to said given direction in which the plasma gas is injected, whereby the electric arc may not block the injection passage; and
   wherein said torch also comprises means mounted onto said supporting means for generating a magnetic field external to the electrodes in a direction parallel to the annular passage in order to rotate said electric arc within said passage between the electrodes and thus reduce erosion of said electrodes while ensuring better mixing of said plasma gas.

2. The plasma torch of claim 1, further comprising:
   a water cooling circuit mounted within said supporting means in order to cool the same and cool the electrodes; and
   at least one electric and heat resistant cover downstream of said electrodes and said outlet nozzle in order to protect the same.

3. The plasma torch of claim 2, wherein the outlet nozzle is formed within the insulating cover.

4. The plasma torch according to claim 2, wherein said central electrode has a frusto-conical shape, and the annular passage between the electrode has a conical shape and opens into the outlet nozzle.

5. The plasma torch of claim 4, wherein the central and peripheral electrodes are respectively an anode and a cathode.

6. The plasma torch of claim 4, wherein the central and peripheral electrodes are respectively a cathode and an anode, and wherein the tip of the central electrode comprises a ring-shaped insulation tip through which opens the injection passage injection tube passes.

7. The plasma torch according to claim 2, wherein both electrodes are made of copper or copper alloys.

* * * * *